United States Patent
Joubert et al.

(10) Patent No.: US 7,074,269 B2
(45) Date of Patent: Jul. 11, 2006

(54) HYDRAULIC BINDER WITH ENHANCED AGING PROPERTIES

(75) Inventors: Daniel Joubert, Vineuil Saint Firmin (FR); Mustapha Sari, Villeurbanne (FR); Quintino Carvalho, Lyons (FR)

(73) Assignee: Rhodia Polymide Intermediates, Saint Fons (FR)

( * ) Notice: Subject to any disclaimer, the term of this patent is extended or adjusted under 35 U.S.C. 154(b) by 0 days.

(21) Appl. No.: 10/484,930

(22) PCT Filed: Jul. 15, 2002

(86) PCT No.: PCT/FR02/02507

§ 371 (c)(1),
(2), (4) Date: Aug. 16, 2004

(87) PCT Pub. No.: WO03/010109

PCT Pub. Date: Feb. 6, 2003

(65) Prior Publication Data

US 2004/0255824 A1 Dec. 23, 2004

(30) Foreign Application Priority Data

Jul. 26, 2001 (FR) ................................. 01 10031

(51) Int. Cl.
*C04B 7/00* (2006.01)
(52) U.S. Cl. ...................... 106/810; 106/802
(58) Field of Classification Search ................ 106/802, 106/810
See application file for complete search history.

(56) References Cited

U.S. PATENT DOCUMENTS

| 2,478,831 A | | 8/1949 | MacPherson | |
| 3,955,994 A | | 5/1976 | Hunter et al. | |
| 4,036,806 A | * | 7/1977 | Foley et al. | 524/650 |
| 4,892,586 A | * | 1/1990 | Watanabe et al. | 106/725 |
| 6,114,033 A | * | 9/2000 | Ikemoto et al. | 428/343 |

FOREIGN PATENT DOCUMENTS

| GB | 841304 | 7/1960 |
| JP | 10-95650 A | 4/1998 |

OTHER PUBLICATIONS

Nikiforov, A. P., Derwent Abstract 1984-132803, Aug. 1983.*
Nikiforov, A.P., "Rheological and physicomechanical properties of heavy concrete with additions of a melt of carboxylic acid," Chemical Abstracts, vol. 120, No. 16, Columbus, OH; Abstract No. 1988874a; Apr. 1994.

* cited by examiner

*Primary Examiner*—Elizabeth D. Wood
(74) *Attorney, Agent, or Firm*—Buchanan Ingersoll, P.C.

(57) ABSTRACT

Hydraulic binders, such as cements, mortars with enhanced aging properties, are described. More particularly, hydraulic binders based on mineral silicates are described having greater aging strength, a method for making said binders and their uses and articles obtained from same. An organic compound comprising two hydrophilic functions and a hydrophobic chain such as adipic acid are added to the hydraulic binder to slow down the water uptake rate of said binder.

7 Claims, No Drawings

HYDRAULIC BINDER WITH ENHANCED AGING PROPERTIES

REFERENCE TO RELATED APPLICATIONS

This application is a 371 of PCT Application No. PCT FR02/02507, published in French on Feb. 6, 2003, as WO 03/010109.

The present invention relates to mineral binders, especially hydraulic binders such as Portland or high-alumina cements, with improved ageing.

It relates more particularly to hydraulic binders based on mineral silicates and/or aluminates having better ageing resistance, to a process for manufacturing these binders, to their uses and to articles obtained from such binders.

Hydraulic binders are generally cements based on mineral silicates and/or aluminates used in many industries, more particularly in the building field for the construction of building infrastructures, engineering works, blocks of flats or houses. Cements are also used in the drilling industry and more particularly in the oil industry.

Hydraulic binders are manufactured from natural materials, which are treated at very high temperature in order to remove the water and convert the materials into mineral compounds capable of reacting with water in order to produce a binder which, after drying, forms a compact mass exhibiting good mechanical properties.

The powder obtained from the grinders has a particle size of less than 100 µm. This powder is stored either in silos or packaged in containers of smaller volume, such as bags, before being used for the manufacture of concrete or mortar for example. Thus, this powder may sometimes remain in the storage containers for a very long time and in particular may be exposed to moisture in the air.

Although precautions are taken in the production of containers intended for storing the cement, or hydraulic binder, the latter may form clumps or partially set solid owing to the effect of moisture in the air. Such a phenomenon makes the hydraulic binder unusable or difficult to handle, for example difficult to transfer it from the silos into the transport tankers or into the supply silos on site or in a factory. This phenomenon may affect the properties of the articles or works produced with such a binder.

As hydraulic binder exhibiting such drawbacks, mention may be made of:
Portland cement;
high-alumina cement;
quick-setting cement; and
natural cements of the VICALPE and RAPIDE type.

The hydraulic binders may also be packaged blended with other additives, such as sand in order to form a ready-to-use mortar. The abovementioned drawback is also observed with this type of composition.

One of the objects of the present invention is to propose a hydraulic binder treatment allowing the clumping or setting of the powders to be very greatly reduced or eliminated during their storage, before final use.

For this purpose, the first subject of the invention is hydraulic binders based on mineral silicates and/or aluminates, characterized in that they include an organic compound having at least two functional groups hydrophilic in character and an organic chain hydrophobic in character.

The weight concentration of this organic compound in the hydraulic binder is advantageously between 0.05 and 10% by weight relative to the weight of hydraulic binder, preferably between 0.05% and 5%, advantageously between 0.1% and 2%.

The expression "functional group hydrophilic in character" is understood to mean functional groups that make it possible to achieve compatibility with a water-containing medium. In addition, the hydrophilic functional groups advantageously have the capability of reacting with the metal cations or elements present in the hydraulic binder.

The functional groups suitable for the invention are especially carboxylic acid, acid anhydride, acid halide and primary amine functional groups. Preferred functional groups of the invention are acid or acid anhydride functional groups.

The hydrophobic character of the organic product is provided by an aliphatic, aromatic, alkylaromatic or arylaliphatic hydrocarbon chain. Linear or cyclic, branched or substituted aliphatic and arylaliphatic chains are preferred for the invention. Advantageously, they contain between 2 and 13 carbon atoms.

According to another feature of the invention, the organic compound is advantageously blended with the binder powder obtained after firing. The organic compound is added either in the form of powder or granules, or in the form of liquid, in order thus to impregnate or coat the particles forming the powder of inorganic binder. Organic compounds exhibiting a film-forming character will therefore be preferred. However, this property is only desired by way of preference. Thus, an organic compound which does not form a film but does wet and is adsorbed on the hydraulic binder particles is also suitable for the invention.

Within the context of the invention, the hydraulic binder may be either a cement or a composition comprising a cement with various additives in order to constitute a composition ready to use after addition of water and optionally of fillers, such as sand.

As organic compounds suitable for the invention, mention may be made of polycarboxylic acids, such as dicarboxylic acids like glutaric acid, succinic acid, adipic acid, octanedioic acid, decanedioic acid, dodecanedioic acid, brassylic acid and their anhydrides and acid halides, phthalic acids such as orthophthalic, terephthalic and isophthalic acids.

It is also possible, without departing from the scope of the invention, to use blended acids and more particularly to use a mixture of adipic, succinic and glutaric acids. This mixture is a by-product in industrial processes for manufacturing adipic acid.

The binders according to the invention are less sensitive to moisture uptake, thus extending their storage life in the various forms in which they are contained, such as silos, bags, containers, for example. In addition, the powder exhibits better flowability during the operation of draining packages.

Another subject of the invention is the process for manufacturing hydraulic binders with improved ageing. This process consists in blending the hydraulic binder powder obtained from manufacturing kilns with the organic compound in powder form or in the melt state at a suitable temperature for avoiding degradation of the organic compound. This temperature or temperature range depends, of course, on the nature of the organic compound. Thus, in a first embodiment of the invention, the temperature is designed to be below the temperature for substantial degradation of the organic compound and above the melting point or softening temperature of this compound. In a second embodiment, the particles of hydraulic binder are coated at a low temperature, for example at room temperature, and more generally in a temperature range in which the organic compound is in the solid state.

To give an example, with adipic acid or adipic/glutaric/succinic acid mixtures, this temperature is between 140° C. and 170° C.

Thus, the organic compound, especially adipic acid, may be added to the cement during the step of grinding the clinker output from the kilns.

The organic compound used for the blending may be in the form of granules or powder, the particles of which may be fine or coarse. This organic compound may be added in the melt state to the hydraulic binder.

It is also possible to mix, especially when cold, the organic compound in fine powder form, for example comprising particles having a mean size of less than 50 μm, preferably having a size substantially less than the size of the binder particles, so as in this way to coat the binder particles with the particles of organic compound.

The subject of the invention is also the use of these mineral, especially hydraulic, binders, for the manufacture of mortar, concrete or other standard compositions based on mineral binders. It should be pointed out that the presence of the organic compound does not affect the conditions under which these compositions, such as mortar or concrete are produced, nor their mechanical and rheological properties. On the contrary, it may, in certain applications, improve the processing and the mechanical properties of the products or articles produced from these compositions.

The examples below, given solely by way of indication, illustrate the invention in greater detail.

The abbreviation AA stands for adipic acid.

EXAMPLES 1 AND 2

A Portland cement powder was blended with adipic acid particles. The whole assembly was raised to a temperature of 160° C. for one hour, with stirring in the case of example 2. In contrast, the blending was carried out at room temperature in the case of example 1. The blending was carried out in a mixer with turbulent agitation.

Specimens (20 g) of the powder obtained were placed in containers having an exposed area of 20 cm2. These containers were placed in an enclosure maintained at room temperature and with a relative humidity of 75% at room temperature (15–25° C.).

The water uptake, expressed as mass of water adsorbed per 100 g of binder, of these specimens was determined by weighing after different periods of exposure. The results obtained are indicated in Table I below.

TABLE I

| Duration | Comparative example Portland cement | Example 1 Portland cement +0.2% AA (particle size about 15 μm) | Example 2 Portland cement +0.2% AA (particle size about 250 μm) |
|---|---|---|---|
| 7 days | 1.00 | 0.00 | 0.25 |
| 15 days | 1.25 | 0.34 | 0.69 |
| 21 days | 1.31 | 0.56 | 0.86 |
| 25 days | 1.41 | 0.80 | 0.99 |

EXAMPLE 3

Several powders of different hydraulic binders were blended with 0.5% adipic acid in the form of particles with a mean size of 15 μm, according to the procedure described in example 1. These powders were exposed to an atmosphere having a relative humidity of 75% at room temperature. The water uptake of these various powders after exposure for 8 days are indicated in Table II below.

TABLE II

|  | Control, without adipic acid | Binder, with 0.5 wt % adipic acid |
|---|---|---|
| High-alumina cement | 0.24 | 0.06 |
| Quick-setting cement | 1.63 | 1.18 |
| VICALPES ® quick-setting cement | 1.66 | 1.34 |

EXAMPLE 4

Portland cement was blended with various amounts of adipic acid particles having a mean size of 15 μm at room temperature. These blends were placed in containers having an exposed area of 80 cm2 for a 20 g specimen mass.

The containers were placed in an enclosure having an atmosphere with a relative humidity of 75% at room temperature.

The water uptake of these specimens after various periods of exposure are given in Table III below.

TABLE III

|  | 1 day | 2 days | 3 days | 5 days | 6 days | 7 days | 9 days | 14 days |
|---|---|---|---|---|---|---|---|---|
| Control | 0.95 | 1.28 | 1.51 | 3.75 | 10.80 | 10.80 | 11.30 | 22.14 |
| Cement + 0.1% AA | 0.25 | 0.35 | 0.40 | 0.90 | 2.30 | 2.34 | 2.55 | 3.22 |
| Cement + 0.2% AA | 0.12 | 0.18 | 0.22 | 0.34 | 0.38 | 0.45 | 0.47 | 1.90 |
| Cement + 0.3% AA | 0.12 | 0.20 | 0.26 | 0.40 | 0.44 | 0.72 | 0.80 | 3.10 |

EXAMPLE 5

Example 1 was repeated but with the adipic acid powder replaced with 0.5% by weight of brassylic acid having a mean particle size of about 20 μm. After 10 days of storage in an atmosphere with a relative humidity of 75% at room temperature, the water uptake was 1.05 g of water per 100 g of binder. Without the addition of organic compound, the binder picked up 1.40 g of water per 100 g of binder under similar conditions.

The invention claimed is:

1. A storage-stable powdered composition having reduced tendency to clump or set during storage, consisting essentially of a silicate-based and/or an aluminate-based hydraulic binder powder and an organic acid selected from the group consisting of adipic acid and a mixture of adipic, glutaric and succinic acids, wherein the weight concentration of said organic acid is between 0.1 percent and 2 percent relative to the weight of hydraulic binder, and wherein the composition is prepared by blending the organic acid in fine powder form or in the melt state with the hydraulic binder.

2. The composition according to 1, wherein the organic acid is adipic acid.

3. The composition according to 1, wherein the organic acid is a mixture of adipic, glutaric and succinic acids.

4. The composition according to 1, wherein the hydraulic binder is selected from the group consisting of Portland cement, high-alumina cement and quick-setting cement.

5. Process for manufacturing a composition according to claim 1, which comprises blending the organic acid in the melt state with the hydraulic binder.

6. Process according to 5, wherein the blending is carried out at a temperature of between 140° C. and 170° C., in agitated form.

7. Process according to 6, wherein the blending is carried out at room temperature, with a powder of the organic acid having particles with a size of less than 50 μm.

* * * * *